United States Patent [19]

Johnson et al.

[11] 4,206,584
[45] Jun. 10, 1980

[54] FLOATING CUTTERBAR HEADER

[75] Inventors: Orlin W. Johnson, East Moline, Ill.; Dathan R. Kerber, Bettendorf, Iowa

[73] Assignee: International Harvester Company, Chicago, Ill.

[21] Appl. No.: 939,003

[22] Filed: Sep. 1, 1978

[51] Int. Cl.$^2$ ............................................. A01D 47/00
[52] U.S. Cl. ....................................... 56/15.8; 56/210; 56/314
[58] Field of Search ................................ 56/15.7–15.9, 56/208, 210, 314, 15.3

[56] References Cited
U.S. PATENT DOCUMENTS

| | | | |
|---|---|---|---|
| 2,247,687 | 7/1941 | Johnston | 56/15.7 |
| 2,472,762 | 6/1949 | Sage | 56/15.7 |
| 2,875,568 | 3/1959 | Watamaker | 56/210 |
| 3,021,660 | 2/1962 | Huseman | 56/210 |
| 3,168,800 | 2/1965 | Dyrdahl | 56/210 |
| 3,967,439 | 7/1976 | Mott | 56/314 |
| 3,981,125 | 9/1976 | Kerber et al. | 56/208 |
| 4,091,602 | 5/1978 | Williams et al. | 56/15.3 |

Primary Examiner—Jay N. Eskovitz
Attorney, Agent, or Firm—Neal C. Johnson; F. David AuBuchon

[57] ABSTRACT

A crop harvesting header for a self-propelled combine. The header includes a "floating" flexible cutterbar movable vertically relative to the header frame to cut a standing crop (soybeans, for example) close to the ground to minimize crop losses. The cutterbar is connected to a plurality of runner structures pivotally mounted on the header frame. A spring system is operative on the runner structures to resiliently counterbalance the cutterbar. Structure is adjustably operative on the runner structures to selectively limit the range of movement of the cutterbar or to lock it against movement. Elongated skids are connected between adjacent pairs of runners to effectively extend along the length of the header. The skids are mounted to permit individual movement of the runners relative to each other as the cutterbar flexes over uneven ground across the harvesting path. The skids are selectively shiftable by crank pins to vary the cutting height of the cutterbar. The header includes a floor structure having portions mounted for upward pivotal movement to provide access to the crank pins when skid adjustment is desired.

The header frame includes vertical end walls. A crop divider is disposed adjacent to each end wall. Each of the dividers is mounted on the respective end runner and also connected to the respective end wall so as to be movable up and down in a relatively constant attitude commensurate with cutterbar movement.

21 Claims, 9 Drawing Figures

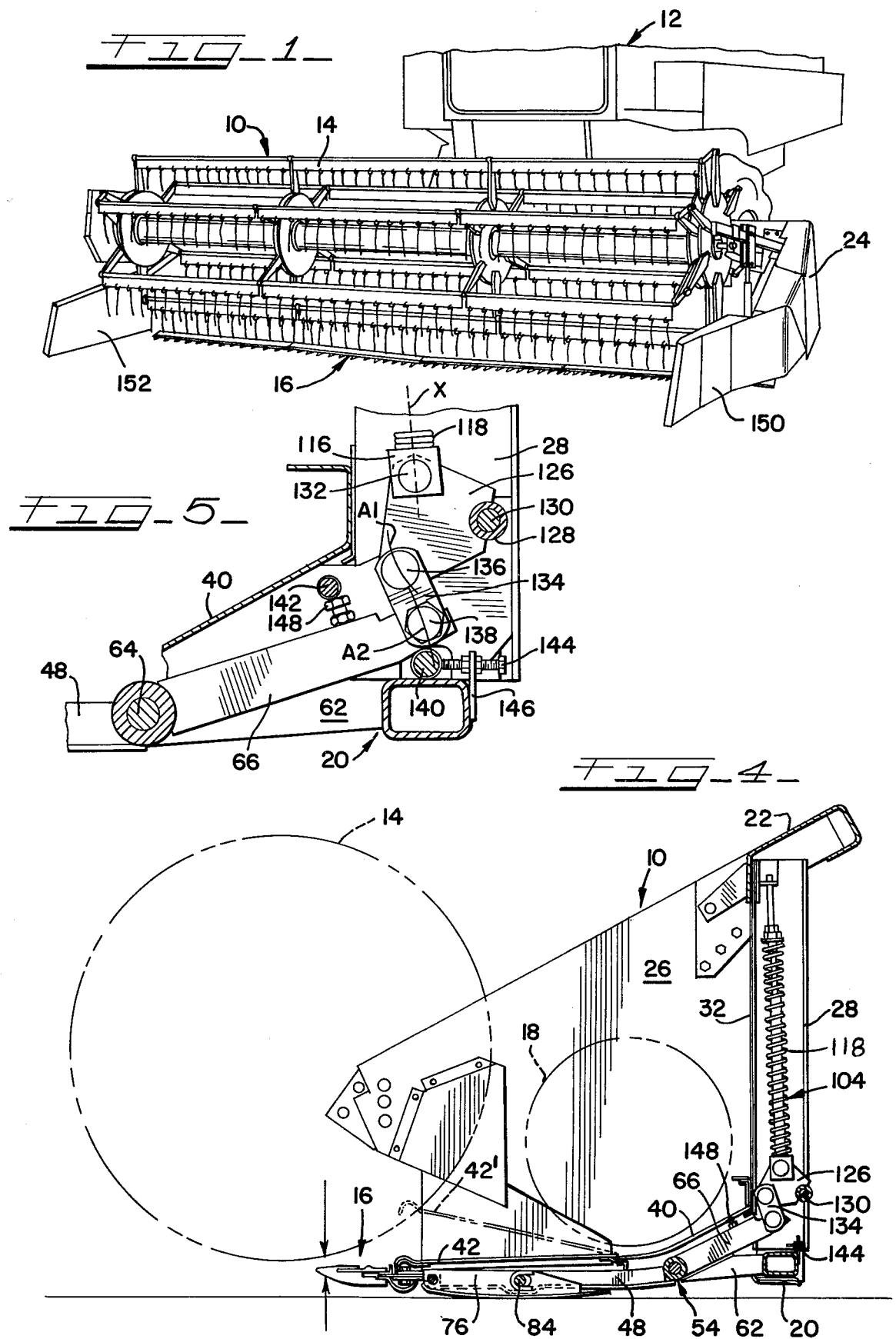

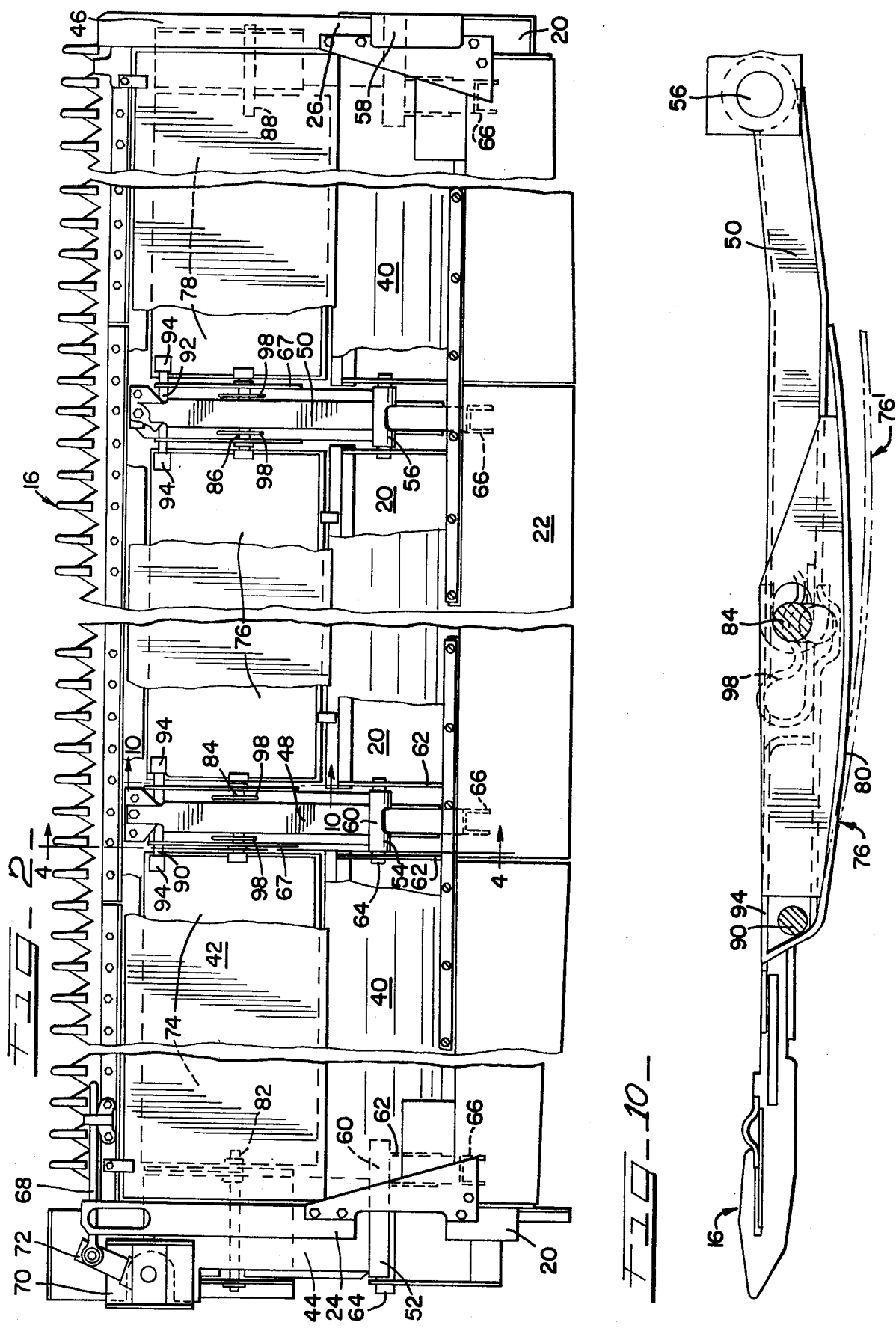

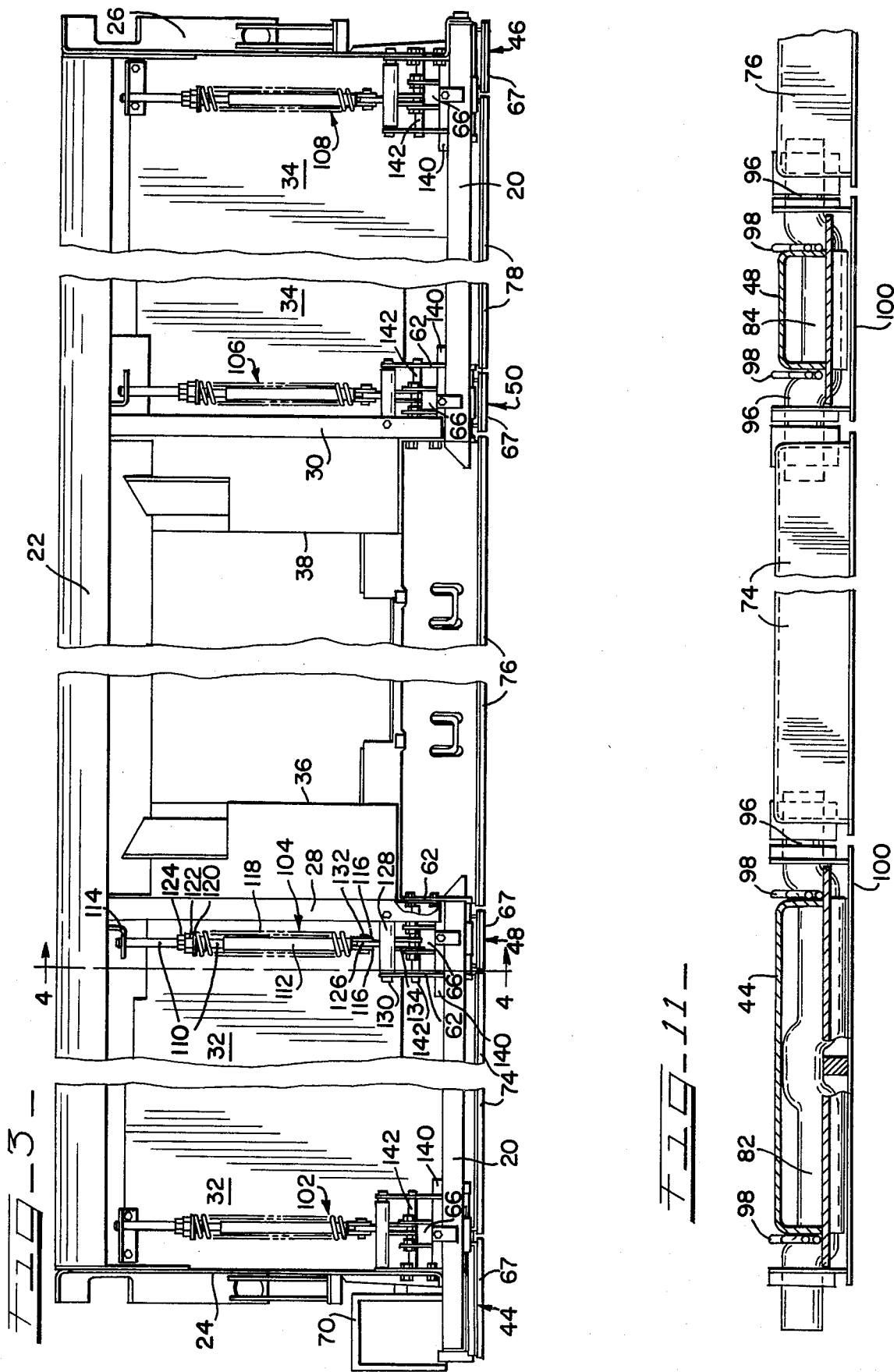

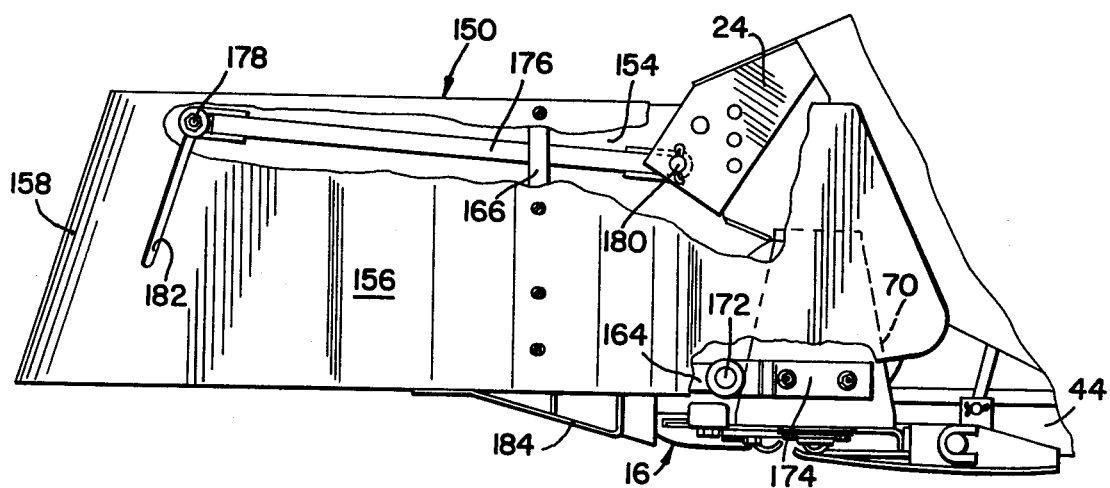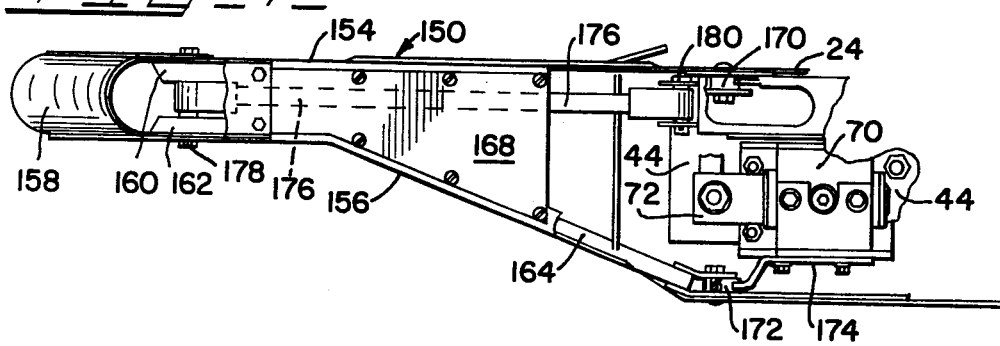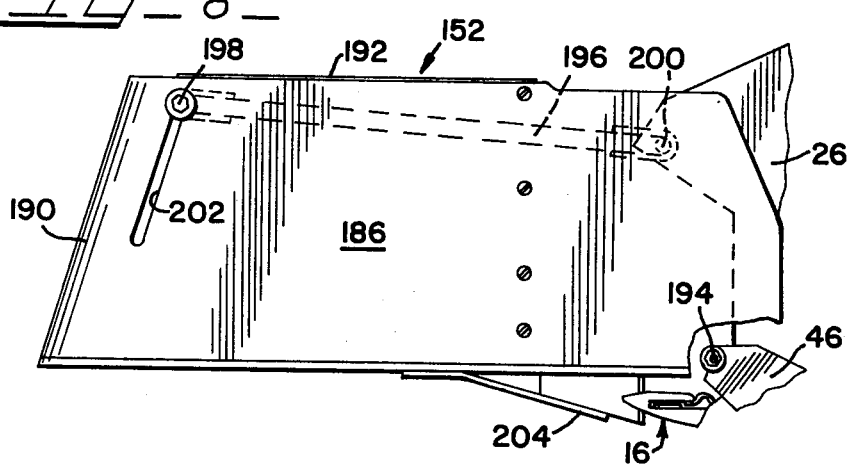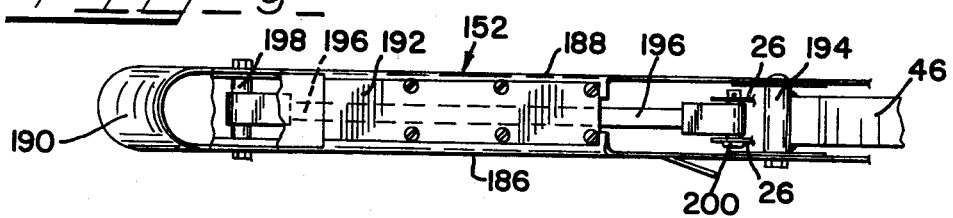

FLOATING CUTTERBAR HEADER

BACKGROUND OF THE INVENTION

1. Field of the Invention

The invention relates generally to crop harvesting headers and more particularly to an improved floating cutterbar type header.

2. Prior Art

U.S. Pat. No. 2,472,762 shows means at 45 for adjusting the range of movement of a floating cutterbar. The adjusting structure 45 is located beneath a skirt 49 fixed on the header beam 21. The structure 45 is located just behind the sickle bar unit 41 and thus is underneath the pickup reel 50. The problem with such an arrangement is that the float range cannot be quickly and conveniently adjusted due to the difficulty in gaining access to the adjustment structure beneath the reel 50 and covered by the skirt 49.

U.S. Pat. Nos. 3,168,800, 3,021,660, and 2,875,568 are examples of adjustable skid structures on headers for varying the cutting height. None of these, however, relates to the problems of selecting and maintaining optimum cutting heights of floating type cutterbars and particularly those which are vertically flexible along their length to accommodate uneven ground across the harvesting path. Modern crop headers are of substantial length such that ease of access to the cutting height adjustment structure is a practical problem.

A further problem with headers is accommodating any crop row spacing for a particular header width without adjustment of the header. This is termed "non row-sensitive" and is accomplished by providing ground-engaging skid structure along substantially the entire length of the header. The above mentioned U.S. Pat. No. 2,895,568 shows such a skid at 25. However, that patent leaves to conjecture how a header with a flexible cutterbar could be made non row-sensitive.

While it is known to mount a crop divider on a tractor by a "parallel bar" type linkage (U.S. Pat. No. 2,247,687), the operating environment shown therein does not relate satisfactorily to problems in harvesting small grains and soybeans the latter being particularly susceptible to gathering losses at the header. For example, it will be seen in U.S. Pat. No. 2,247,687 that the divider 30 must move forwardly and rearwardly as it moves up and down due to the non-horizontal geometry of its mounting structure. Such forward and rearward movement of the divider relative to the crop being harvested could only increase the possibility of dislodging the grain heads or beans from the plants. Moreover, this prior art mounting geometry makes the divider tip susceptible to digging into ground obstructions due to its relatively high vertical force vector.

Another problem with crop dividers is in the manner in which the divider engages the ground. Particularly in soybeans, there can be small branches and leaves between the rows. Dividers which slide along the ground on front-mounted shoes can push the branches and leaves along the ground, thus interfering with the crop-cutting operation.

SUMMARY

The invention provides an improved floating cutterbar header having: means for readily adjusting the operating range of movement of the cutterbar; means for readily adjusting the cutting height of the cutterbar; means supporting the cutterbar along the length of the header to make the header non row-sensitive while permitting the cutterbar to flex vertically to accommodate uneven ground; and dividers which move vertically in conjunction with movement of the cutterbar to maintain the tips of the dividers close to the ground to lift leaning or fallen plants for cutting, and which move without significant fore-and-aft shifting relative to the crop.

The header of the invention effectively deals with the above mentioned problems and harvests small grains and soybeans at high speeds with reduction of crop losses.

BRIEF DESCRIPTION OF THE DRAWINGS

FIG. 1 is a fragmentary perspective view of a crop harvesting header mounted on a self-propelled combine;

FIG. 2 is a plan view of the crop harvesting header of FIG. 1;

FIG. 3 is a rear elevational view of the header;

FIG. 4 is a sectional view of the header taken along lines 4—4 of FIG. 3;

FIG. 5 is an enlarged fragmentary sectional view of a portion of the counterbalancing and range control system for a floating cutterbar type header;

FIG. 6 is a fragmentary elevation view of one of the crop dividers of the header of FIG. 1;

FIG. 7 is a plan view of the divider structure of FIG. 6;

FIG. 8 is a fragmentary elevation view of the other crop dividing header of FIG. 1; and FIG. 9 is a plan view of the crop divider of FIG. 8.

DESCRIPTION OF THE PREFERRED EMBODIMENT

Referring first to FIG. 1 there is shown a header 10 mounted by conventional meamns on a self-propelled combine 12. The header 10 includes a conventional reel 14 for engaging a standing crop and moving it rearwardly for cutting by a cutterbar shown generally at 16 extending the length of the header. An auger 18 (shown schematically in FIG. 4) consolidates the cut crop centrally on the header from which the crop is moved rearwardly by conventional means into the combine.

As best shown in FIGS. 2 through 4 the header 10 has the basic structural framework including a lower beam assembly 20, an upper beam assembly 22, opposite end walls 24 and 26, and vertical channels 28 and 30 (FIG. 3) extending between the upper and lower beam assemblies. Sheet structures 32 and 34 are disposed vertically along the rear of the header from the respective end walls 24 and 26 inwardly and terminate at respective edges 36 and 38 which together with the upper and lower beams defined the feed outlet opening to the combine. A fixed bottom sheet 40 extends between the end walls 24 and 26 beneath the auger 18 and together with the back sheets 32 and 34 provide a so-called "wrap" for the crop conveying auger 18. A movable sheet 42 is pivotally connected to the forward edge of the sheet 40 and is slidably connected along its foward edge to the cutterbar 16. In practice the sheet 42 may consist of several longitudinally overlapping sections to facilitate vertical flexure of the cutterbar along its length.

The cutterbar 16 is supported on the header 10 by a pair of end runners 44 and 46 and a pair of internal runners 48 and 50 all connected at their forward ends to the cutterbar. Each of the runners 44, 48, 50, and 46 is pivotally connected to the header by pivot structures shown at 52, 54, 56, and 58 respectively in FIG. 2. Each pivot structure includes a cylindrical bushing 60 welded to the respective runner, a pair of plates 62 welded to the lower beam assembly 20, and a pin 64 mounted through the plates 62 and the bushing 60. It will of course be understood that the pivot connections are coaxially aligned and permit the cutterbar 16 to move up and down relative to the header. As best shown in FIGS. 4 and 5 the pivot connections are disposed intermediate the ends of the runners thus defining a rearward end 66 of each runner projecting rearwardly of the back wall 32 and 34 of the header and above the lower beam assembly 20. In practice, an additional runner (not shown) may be connected to the cutterbar midway between the intermediate runners 48 and 50 to provide additional support. Further, each runner is preferably equipped with a ground-engaging shoe shown at 67 in FIGS. 2 and 3 and thus reference to "runner" herein includes such ground-engaging structure.

The cutterbar 16 is itself of the usual type having a reciprocating knife 68 driven by a wobble drive unit 70. The drive unit 70 has a rotary input drive (not shown) and an oscillating output drive arm 72 connected to the knife 68. The unit 70 is mounted on the end runner 44 outside of the wall structure 24 of the header. The cutterbar 16 is vertically flexible along its length so as to maintain a close cutting relation to the ground despite ground level variations across the harvesting path of the header.

As shown in the plan view of FIG. 2 an elongated skid 74 is disposed between the runners 44 and 48, another skid 76 is disposed between the runners 48 and 50, and another skid 78 is disposed between the runners 50 and the end runner 46. As mentioned above the header in practice may include a center runner (not shown) between the runners 48 and 50 in which case the header would include two skids (one on each side of the center runner) instead of the single skid 76. The skids 74, 76, and 78 are connected to and supported on the adjacent runners so as to be movable vertically with the cutterbar 16. The skids are disposed in alignment along substantially the entire length of the header and provide the basic ground engagement and support for the floating cutterbar. As best shown in FIG. 10 the skids have a curved bottom sheet 80 providing slidable ground support.

As best shown in FIG. 2 the skids are connected to the adjacent runner structures by means including crank pins 82, 84, 86 and 88 journalled in the respective runners 44, 48, 50 and 46. In addition, the forward portions of the skids have a lost-motion connection with a pair of pins 90 and 92 fixed on the forward ends of the runners 48 and 50 respectively, there being a similar pin on each of the other runners as well. As shown in FIG. 2 each pin 90 and 92 projects through the respective runner to extend into a box structure 94 on each of the adjacent ends of the adjacent skids. As shown in FIG. 10 the box structure 94 has a vertical dimension greater than the diameter of the pin 90 permitting the skid 76 to pivot in use about the aligned crank pins 84 and 86 within the limits provided by the engagement of the box structure 94 with the fixed pin 90. It will be understood that the other pin 92 has the same lost-motion connection with the adjacent skid ends. Accordingly, the skids can pivot somewhat about the crank pins to maximize ground support as ground level varies.

As best shown in FIG. 11 the crank pins as illustrated by the pins 82 and 84 have ends 96 which are offset from the main body of the pin and project into the adjacent skids. Rotation of the crank pins 180° will shift the skids relative to the runners (shown at 44 and 48 in FIG. 11) about the pins 90 and 92 between the solid and dotted line positions shown in FIG. 10. In a practical embodiment the skids can be set in the raised position to provide a nominal cutting height of 1.5 inches (40 mm) or shifted by the crank pins to the lower dotted line position to provide a nominal cutting height of 2.2 inches (56 mm). The higher cutting position is useful for soft ground or rocky conditions.

The skids are retained in either the raised or lowered position by so-called QA-(Quick Attaching Cotter) pins 98 extending through the crank pins. In practice the skid position adjustment requires simply swinging the bottom sheets 42 (FIG. 4) upwardly to the dotted line position, removing the QA pins 98 from the two crank pins supporting each skid, rotating one of the crank pins by using a QA pin as a lever, and reinserting the QA pin to hold the crank pins against rotation to thus retain the skid in the selected position. Of course the same steps are repeated for each skid along the header. By this structure and operation the cutting height of the cutterbar 16 is readily changeable. In practice, each of the runner-mounted ground-engaging shoes 67 is pivotally mounted on the respective runner for shifting movement with the above described skids. The shoes 67 preferably have a ground-engaging configuration similar to that of the skids.

Means are provided for counterbalancing the cutterbar so that the skids and shoes will engage the ground with a substantially constant pressure as the cutterbar moves up and down with ground level variations. As shown generally in FIG. 3 a plurality of counterbalancing assemblies are shown at 102, 104, 106, and 108 disposed adjacent to the rear wall structure of the header and operatively associated with the runners 44, 48, 50 and 46 respectively. Each of the counterbalancing assemblies is essentially the same in construction and hence only the assembly 104 shown in FIGS. 3, 4, and 5 will be described in detail.

An elongated rod 110 is telescopically received in a tube 112. The upper end of the rod 110 is threaded and is retained in a bracket 114 fastened to the rear wall structure of the header. The lower end of the tube 112 is welded to a pair of spaced ears 116 (FIG. 3). An elongated coil spring 118 is disposed about the tube 112 and rod 110 in engagement at its lower end with the ears 116 and at its upper end with a washer 120 on the threaded portion of the rod 110. The washer 120 is retained against an adjustment nut 122 which is in turn backed by a lock nut 124.

Each of the counterbalancing assemblies further includes a plate or arm 126 having a transverse integral sleeve 128 journalled on a pin 130 extending through the plates 62 of the header frame. The plate 126 is received between the ears 116 and is pivotally connected thereto by a pin 132. A pair of parallel bar links 134 is pivotally connected between the plate 126 and the runner end 66 by pins 136 and 138. It will be seen in FIG. 5 that the links 134 are disposed in foce-transmitting relation generally along a line tangent to arcs A1 and A2 drawn about the pivot axes of the plate 126 and runner end 66 respectively. Moreover, the links 134 remain in substantially the same orientation throughout the full range of movement of the runner end 66. The effect of this orientation will be clearer as the description proceeds.

In operation, the ground pressure of the cutterbar can be preselected by adjusting the force of the spring 118 of each counterbalancing assembly. This is accomplished by turning the adjustment nut 122 up or down on the rod 110 to vary the length of the compressed spring. The lock nut 124 retains the adjustment nut 122 in the desired position. A practical example of preselecting ground pressure for given field and crop conditions would be for stiff stubble conditions requiring heavy contact pressure to crush the stubble to achieve a low cutting height.

As will be seen with reference to FIG. 4 the cutterbar 16 is floatably supported at each runner by the respective coil spring 118 exerting a downward force on the plate 126 tending to pivot it downwardly about the pivot pin 130. The force is transmitted through the pair of links 134 to the runner end 66. This tends to lift the cutterbar about the pivot connection 54 of the runner to the header. Referring to FIG. 5 the coil spring 118 exerts its force downwardly along the dotted line X. Should the runner end 66 swing downwardly about pin 64 the plate 126 would then pivot downwardly about pin 130. It will be seen that the force line X of spring 118 will shift to the left away from the pin 130. Accordingly, the moment arm of the spring force increases even as the force of the spring itself decreases through expansion of the spring. The above-mentioned orientation of the links 134 now comes into play. Because the line of force through the links 134 is disposed tangentially to the arcs A1 and A2, there is minimal change in the moment arm about the pivot pin 64 of the runner. Thus, the change in the moment arm between force line X and the pivot pin 130 remains the principal factor in maintaining a substantially constant counterbalancing force as the force of the spring 118 varies. In actual practice the counterbalancing force is not exactly constant but is definitely much less variable than the spring force.

The header of the invention includes means for selectively limiting the range of movement of the cutterbar. As shown in FIGS. 3 and 5, a first stop pin 140 is disposed through openings in the plate 62 on top of the beam 20 in position to be engaged by the underside of the runner end 66. A second stop pin 142 is disposed through openings in the plates 62 so as to be retained above the runner end 66. The pins 140 and 142 are retained against axial sliding movement by cotter pins (not shown) extending therethrough abutting against the plate 62. It will be apparent with reference to FIG. 5 that the pin 140 is positioned to limit downward movement of the runner end 66 about runner pivot pin 64, and the pin 142 is disposed to limit upward movement.

The range limiting means further includes means for adjusting the effective movement-limiting position of the pins 140 and 142. The pin 140 is mounted through openings in the header frame plate 62 such that the pin can shift through a limited distance forwardly and rearwardly of the header. As best shown in FIG. 5 a bolt 144 is adjustably mounted through a plate 146 welded to the header beam 20. The bolt 144 thus provides an adjustable abutment for the pin 140. The pin 142 is itself not shiftable forwardly or rearwardly relative to the plate 62. However, an adjustment bolt 148 is threadly mounted on the runner end 66 in position to engage the relatively fixed pin 142.

The operation of the range control structure is simple and effective. When the header is to be used to harvest small grains the cutterbar 16 is locked against vertical movement. This simply involves installing the pins 140 and 142 and adjusting the bolts 144 and 148 so that the runner end 66 of each runner is firmly held between the pins 140 and 142. In harvesting other crops the range of movement in a practical embodiment can be changed to 2.0 inches (50mm) by removing the pin 140 and can be further increased by 4.0 inches (100 mm) by removing the upper pin 142. The shortened range reduces nominal knife-to-reel clearance (shown between the arrows in FIG. 4) which may be necessary in extremely short crop conditions to enable the reel 14 to move the crop rearwardly to the auger 18. Removal of both pins 140 and 142 as shown in FIG. 4 will allow the cutterbar 16 to move through a full range of six inches (150 mm) for operation on rolling ground. The range control and lockout pins 140 and 142 are readily accessible at the rear of the header for adjustment or service attention.

As shown generally in FIG. 1 the header 10 is provided with a pair of crop dividers 150 and 152 projecting forwardly from the respective header endwalls 24 and 26. The divider 150 is shown in detail in FIGS. 6 and 7 wherein it includes an inner wall 154 and an outer wall 156 joined together at their forward ends in a curved and upwardly inclined nose portion 158. The walls 154 and 156 are of light weight sheet metal secured to suitable internal bracing structure including a pair of upper angle members 160 and 162, a lower channel member 164, a vertical brace 166, and a top sheet 168.

In accordance with a feature of the invention the divider 150 is mounted on the end runner 44 of the header and is also supported from the end wall 24 of the header. Referring still to FIGS. 6 and 7 a pivot connection is provided between the divider 150 and the end runner 44 by a pair of coaxial connections 170 and 172. The connection 170 is established between the inner wall structure 154 and the runner 44, while the connection 172 is established between the divider channel 164 and a bracket 174 bolted to the side of the wobble drive unit 70 which is bolted on the runner 44.

The divider 150 is connected to the end wall 24 by an elongated rigid link 176 pivotally connected at 178 to the divider walls 154 and 156. The link 176 is pivotally connected at 180 with a fore-and-aft lost motion connection to the end wall 24. It will be seen in FIG. 6 that the walls 154 and 156 are identically slotted at 182 such that the connection 178 may be established at any preselected point along the slots 182. In this way the attitude of the divider 150 relative to the ground may be preselected and adjusted. The divider 150 includes an integral deflector 184 on the bottom thereof disposed forwardly of the cutterbar 16 for deflecting crop material under the knife.

It will be seen that the divider 150 is suspended from the header on which could be termed a "parallel bar" linkage. That is, the runner 44 itself is one of the "parallel bars" from its pivot connection 52 (FIG. 2) to the header forwardly to the pivot connections 170 and 172 to the divider. The other "parallel bar" is the link 176. Due to the generally horizontally parallel relationship of the runner 44 and the link 176 the forward end of the divider has no appreciable forward or rearward movement as it moves up and down with the cutterbar. In some conditions it may be desirable to tilt the divider upwardly and this is accomplished by simply loosening the connection 178 and then retightening it at a point further down in the slots 182. The lost motion in the connection 180 permits the divider to pivot about the runner connections 170 and 172 upon engaging a ground obstruction without lifting the runner.

The divider 152 on the other end of the header is shown in FIGS. 8 and 9. It is the same in principal and operation as the divider 150 but differs slightly in that the divider 150 is flared as shown in FIG. 7 to encompass the cutterbar drive structure mounted on the runner 44. The divider 152 includes parallel inner and outer walls 186 and 188 joined at their forward ends in a curved and upwardly inclined nose portion 190. The walls 186 and 188 are of light weight sheet metal secured to suitable internal frame structure and having a top sheet 192.

In accordance with a feature of the invention the divider 152 is mounted on the end runner 46 of the header and is also supported from the end wall 26 of the header. Referring still to FIGS. 8 and 9, a pivot connection 194 is provided between the divider 152 and the end runner 46. The divider 152 is connected to the header end wall 26 by a rigid link 196 identical to the link 176 of the other divider 150. The link 196 is connected at 198 to the divider walls 186 and 188 and at 200 with a fore-and-aft lost motion connection to the end wall 26. The walls 186 and 188 are identically slotted at 202 so that the connection 198 may be selectively established at any point along the slots to preset and adjust the attitude of the divider. The divider 152 includes an integral crop deflector 204 on the bottom thereof for the same purpose as deflector 184.

As with the other divider 150, the divider 152 is suspended from the header on a "parallel bar" linkage. The runner 46 from its pivot connection 58 (FIG. 2) to the header forwardly to the pivot connection 194 constitutes one of the "parallel bars". The other "parallel bar" is the link 196. The runner 46 and link 196 are generally horizontally disposed and thus the nose portion 190 has no appreciable forward or rearward movement as the divider moves up and down with the cutterbar. Moreover, there is a minimal vertical force component on the divider tip. The link connections 198 and 200 are adjustable and function in the same manner as the above-described connections 178 and 180 of the divider 160.

By the foregoing it is believed that the invention provides a crop harvesting header particularly well suited to harvesting small grains and soybeans at high speeds with a reduction of gathering losses.

What is claimed is:

1. A harvesting header for a mobile harvesting machine, comprising:
   a header frame;
   a floating cutterbar for cutting a standing crop;
   means mounting the cutterbar on the header frame for vertical movement relative thereto to accommodate variable ground contour, said means including a plurality of transversely spaced fore-and-aft extending runners connected to said cutterbar and pivotally mounted on said header frame, said runners having ends accessible at the rear of the header frame, said ends being movable up and down in response to cutterbar movement;
   and adjustable means operable upon the accessible ends of at least one of the runners for selectively limiting the range of movement of the cutterbar, said adjustable means including a pair of stop elements effective respectively to limit upward and downward movement of a runner, and further including means for adjusting the effective movement-limiting position of each of said stop elements.

2. A harvesting header for a mobile harvesting machine, comprising:
   a header frame;
   a floating cutterbar for cutting a standing crop;
   means mounting the cutterbar on the header frame for vertical movement relative thereto to accommodate variable ground contour, said means including a plurality of transversely spaced fore-and-aft extending runners connected to said cutterbar and pivotally mounted on said header frame, said runners having ends accessible at the rear of the header frame, said ends being movable up and down in response to cutterbar movement;
   and adjustable means operable upon the accessible ends of at least one of the runners for selectively limiting the range of movement of the cutterbar, said adjustable means including a pair of stop elements effective respectively to limit upward and downward movement of a runner, and further including means mounting said stop elements for removal from operative position whereby removal of one of the elements increases the range of movement and removal of both the elements maximizes the range of movement.

3. A harvesting header for a mobile harvesting machine, comprising:
   a header frame;
   a floating cutterbar for cutting a standing crop;
   means mounting the cutterbar on the header frame for vertical movement relative thereto to accommodate variable ground contour, said means including a plurality of transversely spaced fore-and-aft extending runners connected to said cutterbar and pivotally mounted on said header frame, said runners having ends accessible at the rear of the header frame, said ends being movable up and down in response to cutterbar movement;
   and means adjustably operable between the accessible ends of the runners and the header frame for selectively limiting the range of movement of the cutterbar, said adjustably operable means including a pair of stop elements effective respectively to limit upward and downward movement of a runner, and further including means for adjusting the effective movement-limiting position of each of said stop elements.

4. A harvesting header for a mobile harvesting machine comprising:
   a header frame,
   a floating cutterbar for cutting a standing crop;
   means mounting the cutterbar on the header frame for vertical movement relative thereto to accommodate variable ground contour, said means including a plurality of transversely spaced fore-and-aft extending runners connected to said cutterbar and pivotally mounted on said header frame, said runners having ends accessible at the rear of the header frame, said ends being movable up and down in response to cutterbar movement;
   and means adjustably operable between the accessible ends of the runners and the header frame for selectively limiting the range of movement of the cutterbar, said adjustably operable means including a pair of stop elements effective respectively to limit upward and downward movement of a runner, including means mounting said stop elements for removal from operative position whereby removal of one of the elements increases the range of movement and removal of both the elements maximizes the range of movement.

5. A harvesting header for a mobile harvesting machine, comprising:
   a transversely elongated header frame;
   a floating cutterbar for cutting a standing crop, said cutterbar being flexible in a vertical plane;
   a plurality of transversely spaced fore-and-aft extending runners connected to said cutterbar and individually pivotally connected to said header frame for independent movement to permit said cutterbar to move and flex vertically to accommodate varying ground profile;
   a transversely elongated ground-engaging skid connected at its opposite ends to an adjacent pair of said runners so as to extend therebetween in ground engagement to establish the cutting height of the cutterbar above the ground, said skid being connected at its opposite ends to said pair of runners by pivot connections permitting said pair of runners to move up and down relative to each other to accommodate the movement and flexure of the cutterbar over varying ground profile;
   and means for selectively shifting said skid between predetermined positions to vary the cutting height of the cutterbar.

6. The subject matter of claim 5, wherein said means includes a crank pin journalled in a runner and having an offset end received in the skid whereby rotation of the crank pin shifts the skid relative to the runner.

7. The subject matter of claim 6, including a lost-motion connection of the skid to the adjacent runners disposed forwardly of the crank pin enabling the skid to pivot about said crank pin within limits defined by the lost-motion connection to maximize the ground support provided by the skid.

8. The subject matter of claim 5, wherein said header includes a plurality of said skids arranged alternately with said runners in end-to-end relation to span the length of the header, said skids being supported on said runners by pivotal connections permitting the runners to pivot relative to each other to accommodate varying ground profile along the length of the header.

9. A harvesting header for a mobile harvesting machine, comprising:
   a transversely elongated header frame;
   a floating cutterbar for cutting a standing crop, said cutterbar being flexible in a vertical plane;
   a plurality of transversely spaced fore-and-aft extending runners connected to said cutterbar and individually pivotally connected to said header frame for independent movement to permit said cutterbar to move and flex vertically to accommodate varying ground profile;
   a transversely elongated ground-engaging skid pivotally mounted at its opposite ends to an adjacent pair of said runners for pivotal movement about a transversely extending axis, said skid being connected at its opposite ends to said pair of runners by pivot connections permitting said pair of runners to move up and down relative to each other to accommodate the movement and flexure of the cutterbar over varying ground profile;
   and means for selectively shifting said axis to dispose said skid between multiple predetermined positions to vary the cutting height of said cutterbars.

10. The subject matter of claim 9, including a plurality of said skids arranged in transverse alignment alternately with said runners along substantially the entire length of the header.

11. The subject matter of claim 9, wherein said means for shifting includes a crank pin interconnecting the ends of said skid with the adjacent runners such that rotation of said pin shifts said axis.

12. The subject matter of claim 11, wherein said header includes a transversely elongated floor behind said cutterbar and over said skid, and means mounting said floor for selective movement to a position providing direct access to said crank pin.

13. The subject matter of claim 9, wherein said axis is disposed intermediate the front and rear ends of the skid, and means defining a lost-motion connection of the front of the skid with the adjacent runner to permit limited pivoting movement about said axis during harvesting.

14. A harvesting header for a mobile harvesting machine, comprising:
   a transversely elongated header frame having an end wall;
   a floating cutterbar for cutting a standing crop;
   means for mounting said cutterbar on said header frame for vertical movement relative thereto to accommodate varying ground profile, said means including a fore-and-aft extending runner pivotally connected to the header frame and extending forwardly into connection with the cutterbar, said runner being disposed adjacent to said end wall;
   a crop divider for the header disposed adjacent to said end wall;
   and means mounting said divider on said runner and said end wall for vertical movement in a constant attitude in conjunction with vertical movement of the cutterbar.

15. The subject matter of claim 14, wherein said divider mounting means includes a pivot connection between said runner and the divider and a link pivotally connected between the divider and said end wall.

16. The subject matter of claim 15, wherein said runner and said link are generally horizontally disposed whereby the divider has no appreciable forward movement upon raising to clear ground distruction.

17. The suject matter of claim 14, including means for selectively predetermining the attitude of the divider relative to the ground.

18. A harvesting header for a mobile harvesting machine, comprising:
   a transversely elongated header frame having an end wall;
   a floating cutterbar for cutting a standing crop;
   means for mounting said cutterbar on said header frame for vertical movement relative thereto to accommodate varying ground profile, said means including a fore-and-aft extending runner pivotally connected to the header frame and extending forwardly into connection with the cutterbar, said runner being disposed adjacent to said end wall;
   a crop divider for the header disposed adjacent to said end wall;
   and means including said runner providing a parallel bar mounting of said divider from said header frame whereby the divider moves up and down in a substantially constant attitude.

19. The subject matter of claim 18, wherein said means providing a parallel bar mounting includes a pivot connection between said runner and the divider and a link pivotally connected between the divider and said end wall.

20. The subject matter of claim 18, including means for selectively predetermining the attitude of the divider relative to the ground.

21. The subject matter of claim 19, including means providing a lost motion connection in said link permitting tipping of the divider over ground obstructions without lifting the runner.

* * * * *